(No Model.)
C. KLÄUI.
DIVIDERS.
No. 567,810.  Patented Sept. 15, 1896.
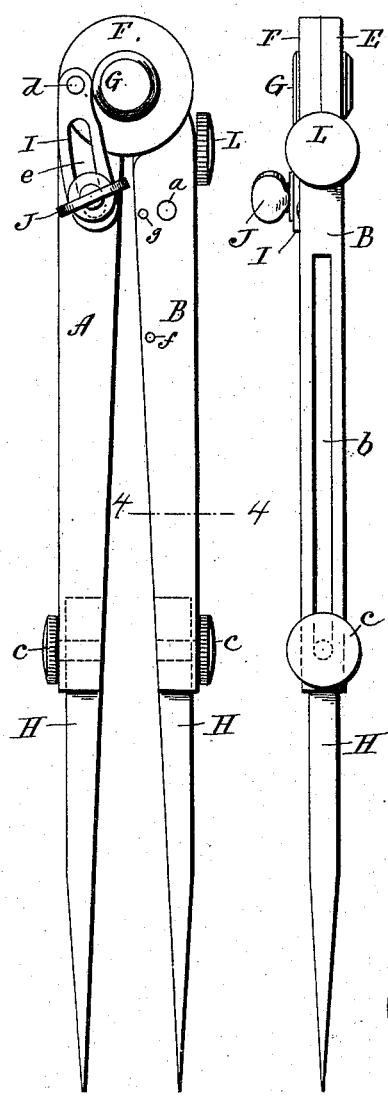
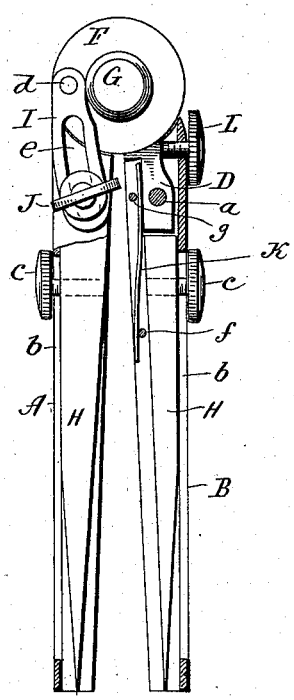
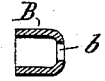
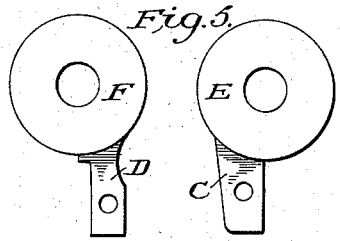

UNITED STATES PATENT OFFICE.

CARL KLÄUI, OF NEW HAVEN, CONNECTICUT.

DIVIDERS.

SPECIFICATION forming part of Letters Patent No. 567,810, dated September 15, 1896.

Application filed December 23, 1895. Serial No. 573,035. (No model.)

*To all whom it may concern:*

Be it known that I, CARL KLÄUI, of New Haven, in the county of New Haven and State of Connecticut, have invented a new Improvement in Dividers; and I do hereby declare the following, when taken in connection with the accompanying drawings and the letters of reference marked thereon, to be a full, clear, and exact description of the same, and which said drawings constitute part of this specification, and represent, in—

Figure 1, a face view with the points projected; Fig. 2, an edge view of the same; Fig. 3, a face view in partial section with the points retired; Fig. 4, a section of one of the legs on line 4 4 of Fig. 1; Fig. 5, a face view of the stumps and hinge-plates detached.

This invention relates to an improvement in dividers, and particularly to such as have combined with them a caliper attachment, so as to practically combine two instruments in one; and the invention consists in the construction and arrangement of parts, as will be hereinafter described, and particularly recited in the claims.

The legs A B are formed of sheet metal bent into substantially U shape, as shown in Fig. 4, and connected at their upper ends to stumps C D, the said leg A being rigidly connected to the stump C and the leg B connected to the stump D by a pivot $a$, upon which the leg is free to turn. The said stump C is formed integral with a plate E and the stump D integral with plate F, which are united by a rivet G, forming a hinge-joint in the manner common to dividers of this character. In the closed outer edges of each of the legs is a slot $b$, through which screws $c\ c$ extend into engagement with the upper ends of points H H, said points being vertically adjustable with relation to the legs A B to the extent of the length of the slot $b$ and may be clamped in any desired position by the said screws $c$. Pivoted to the face of the plate F, as at $d$, is an arm I, formed with a slot $e$, through which slot a set-screw J extends through the leg A and into the stump C, and so that when turned down hard upon the arm I it will firmly unite the leg A to the plate F, which is formed integral with the stump D, to which the other leg B is secured, thus preventing the movement of the legs.

To prevent the leg B turning on the pivot $a$, a strong flat spring K is mounted in the leg B, one end of the spring extending over a pin $f$ and the other end under a pin $g$, which holds that end of the spring against the stump D, the tendency of the spring being to throw the lower end of the leg B outward. In the outer edge of the leg B, and near its upper end, is a threaded opening, adapted to receive an adjusting-screw L, the inner end of which abuts against the edge of the stump D, and so that as the screw is turned inward it will force the lower end of the said leg B inward against the action of the spring K.

The device is operated as follows: The points H H are drawn outward from the legs A B and clamped in the desired position by the screws $c\ c$, as shown in Fig. 1, and when separated to the desired extent may be locked in position by the set-screw J, which clamps the arm I to the leg A, and, as before stated, the said arm being connected to the plate F of the stump D, further movement of the legs is prevented. If slight variation of the points is required, the screw L is turned inward or outward against the stump D, which correspondingly moves the point of the leg B inward or outward, so that a close adjustment may be made. It will thus be seen that the legs may be adjusted to any degree at pleasure and clamped in such position and then the points moved for close adjustment.

By employing a clamp between one of the hinge-plates and the lug secured to the other plate I am enabled to secure as great a degree of adjustment as is ever required in the use of dividers, and by pivoting the clamp at one side of the plate in line with the leg secured to the other plate I am enabled to use a very short arm, and one which always stands in line with the leg, so as to in no sense interfere with the use of the dividers or obstruct the space between the legs, and, furthermore, it is less liable to accidental displacement.

I claim—

1. A pair of dividers, comprising two stumps, which are formed integral with pivotally-connected plates, independently-formed legs, connected to said stumps and points clamped to said legs into which they may be retired, and an arm pivoted to the plate of one stump at one side, and in line with the leg secured to the other stump, to which leg said arm is adapted to be clamped, substantially as described.

2. A pair of dividers comprising two stumps, which are formed integral with pivotally-connected plates, independently-formed legs secured to said stumps, one of them by a pivot permitting said legs to move independently of the stump, an adjusting-screw mounted in said leg and having bearing in the said stump, whereby said leg is moved, a spring tending to move said leg against the screw, points adjustably connected with said legs into which they may retire, and an arm pivoted to the plate of one stump at one side, and in line with the leg secured to the other stump, to which leg the arm is adapted to be secured, substantially as described.

In testimony whereof I have signed this specification in the presence of two subscribing witnesses.

CARL KLAUI.

Witnesses:
FRED C. EARLE,
LILLIAN D. KELSEY.